United States Patent

[11] 3,596,677

| [72] | Inventors | Richard J. Clark<br>Racine;<br>John L. Acheson, Franklin; Lawrence R.<br>Landherr, Racine, all of, Wis. |
|---|---|---|
| [21] | Appl. No. | 790,803 |
| [22] | Filed | Jan. 13, 1969 |
| [45] | Patented | Aug. 3, 1971 |
| [73] | Assignee | Rex Chainbelt Inc. |

[54] REMOTELY OPERABLE PRESSURE COMPENSATED FLOW CONTROL VALVE
4 Claims, 6 Drawing Figs.

[52] U.S. Cl........................................ 137/501,
91/446, 91/461
[51] Int. Cl..........................................F16k 17/22,
F15b 11/04
[50] Field of Search............................ 137/501,
614.19, 613, 489, 625.61; 91/446, 461

[56] References Cited
UNITED STATES PATENTS

| 2,487,520 | 11/1949 | Brown........................... | 137/503 X |
| 2,625,136 | 1/1953 | Moog, Jr. ..................... | 137/625.61 |
| 2,272,684 | 2/1942 | Vickers......................... | 137/501 X |
| 2,608,209 | 8/1952 | Bryant........................... | 137/501 |
| 3,116,600 | 1/1964 | Fleming et al. ............... | 137/501 X |
| 3,181,559 | 5/1965 | Hipple et al. ................. | 137/489 |

Primary Examiner—Arnold Rosenthal
Attorney—Hofgren, Wegner, Allen Stellman & McCord ABSTRACT: A flow control valve and, more particularly, a pressure compensated flow control valve having a feed spool settable to determine the rate of fluid flow and remote power means for setting the feed spool, more particularly, an electrically operated pilot pressure control unit which can establish a pilot pressure acting on the feed spool and a pressure compensating valve which maintains a nearly constant pressure drop across the feed spool.

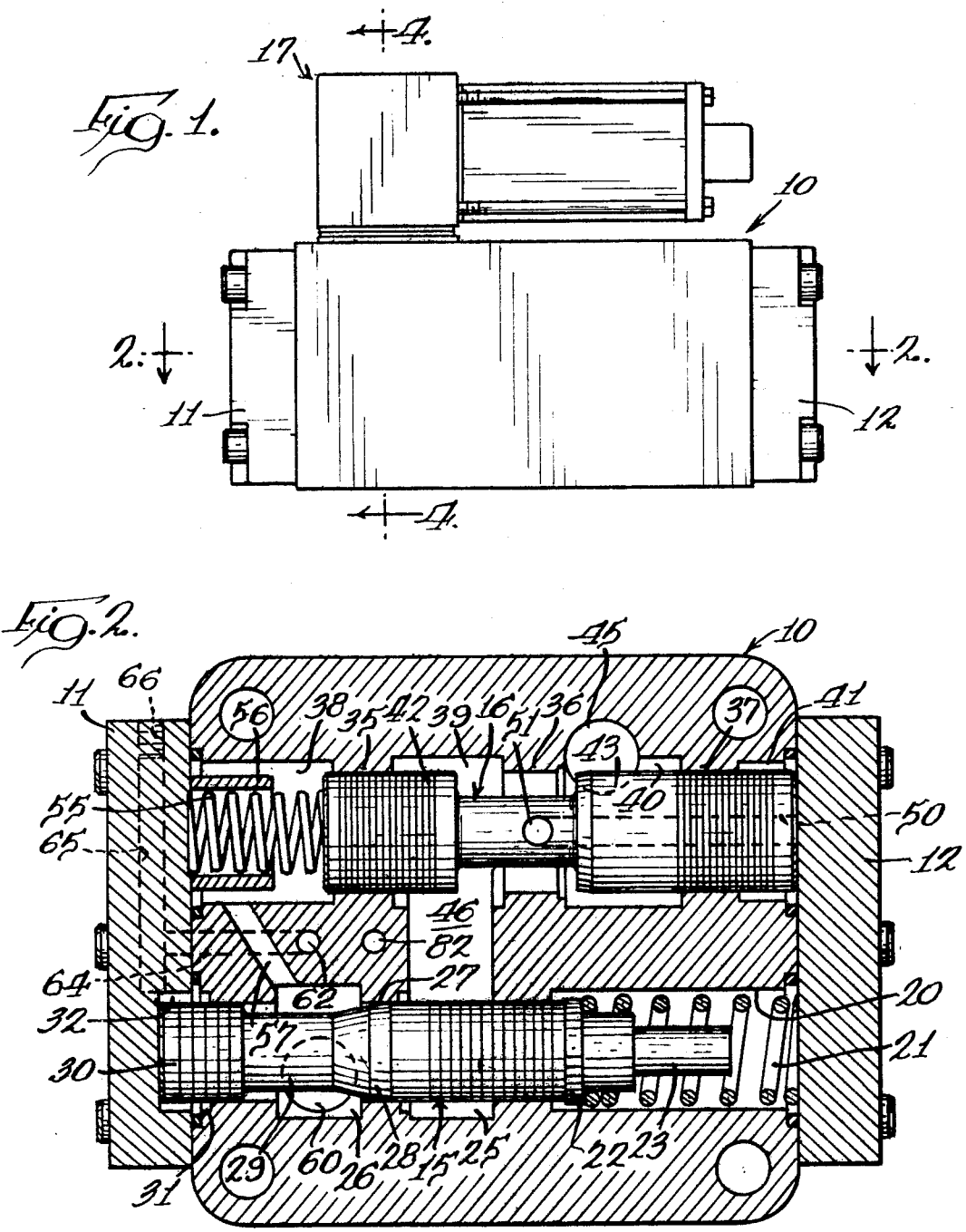

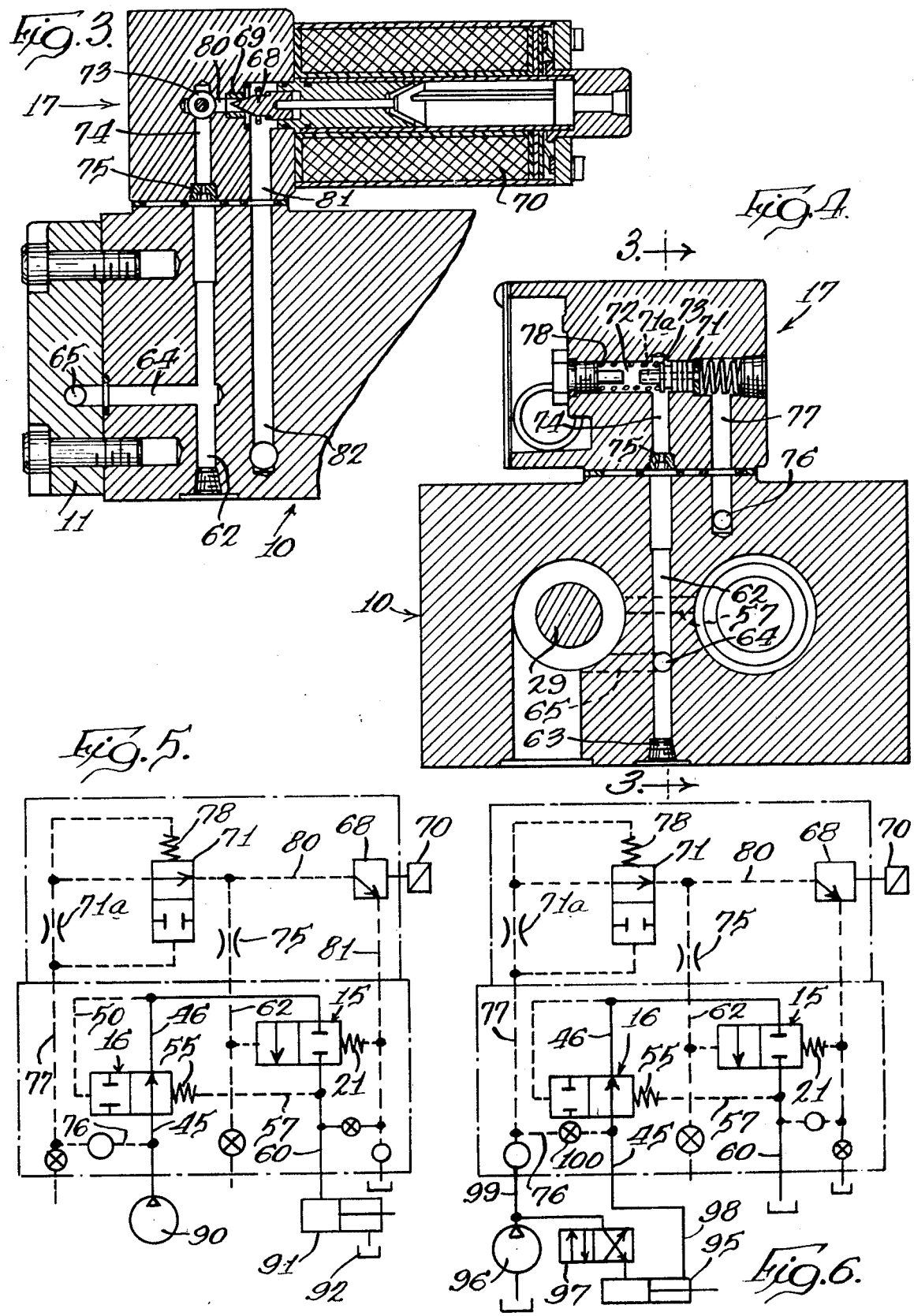

REMOTELY OPERABLE PRESSURE COMPENSATED FLOW CONTROL VALVE

BACKGROUND OF THE INVENTION

This invention pertains to a remotely controllable pressure compensated flow control valve.

Pressure compensated flow control valves are well known, wherein a feed spool can be set to determine the rate of fluid flow and with pressure compensation means to maintain a nearly constant pressure drop. These known flow control valves have not provided for remote setting of the feed spool of the flow control valve, as is accomplished by the invention embodied herein.

SUMMARY

An object of this invention is to provide a new and improved remotely controllable pressure compensated flow control valve.

Another object of this invention is to provide a pressure compensated flow control valve having an adjustable feed spool settable to establish an opening of the desired size for the desired rate of flow, a pressure compensator valve for maintaining a nearly constant pressure drop across the opening established by the feed spool, and remotely operable power means for positioning the feed spool to set the desired rate of flow.

Still another object of the invention is to provide a pressure compensated flow control valve and as described in the preceding paragraph wherein the feed spool is settable to a desired position by a pilot pressure acting upon an end of the feed spool and the pilot pressure is established by a solenoid-operated valve which established a pilot pressure proportional to the degree of energization of the solenoid whereby the flow control valve can be set to a desired rate of flow from a remote control location and the rate may be varied as desired by having the solenoid in a control circuit providing the desired variability.

BRIEF DESCRIPTION OF THE DRAWING

FIG. 1 is a front elevational view of the pressure compensated flow control valve;

FIG. 2 is a section, on an enlarged scale, taken generally along the line 2-2 in FIG. 1;

FIG. 3 is a partial vertical section, taken generally along the line 3-3 in FIG. 4;

FIG. 4 is a vertical section, on an enlarged scale, taken generally along the line 4-4 in fig. 1; FIG.

FIG. 5 is a schematic diagram of the pressure compensated flow control valve used in a metering-in circuit; and FIG. 6 is a diagram, similar to FIG. 5, showing the pressure compensated flow control valve used in a metering-out circuit.

DESCRIPTION OF THE EMBODIMENT

The pressure compensated flow control valve comprises a primary valve body, indicated generally at 10, having end caps 11 and 12 suitably secured to the ends of the valve body 10. The valve body 10 has a feed spool, indicated generally at 15 and a pressure compensating valve spool, indicated generally at 16, movably mounted therein. An electrically operated pilot pressure control head, indicated generally at 17, is fixed to the top of the valve body 10.

The feed spool 15 is movably positioned in a bore in the valve body 10, with the bore having a series of coaxial sections. An end section 20 of the bore closed off by the end cap 12 defines a spring chamber for a rate spring 21 engaging against a shoulder 22 on the feed spool 15 and surrounding a stem 23 which functions as a stop to limit movement of the feed spool toward the right, as viewed in FIG. 2. Sections 25 and 26 of the feed spool bore are divided by a raised land 27 in the bore which coacts with the feed spool to define an annular opening of the desired size for the rate of fluid flow through the pressure compensated flow control valve. The land 27 defines a cylindrical passage and the predominant part of the feed spool 15 is also cylindrical. As shown in FIG. 2, the major diameter of the spool fits closely within the land 27 whereby there is no significant flow past the land 27. The spool 15 has an inwardly tapered section 28, leading toward a reduced diameter portion 29, and when the feed spool 15 is shifted toward the right from the position shown in FIG. 2 the tapered section 28 in effect moves away from the land 27 to define an annular opening. Further movement of the feed spool toward the right will cause an even larger annular opening because of the continuing taper of the spool section 28.

An end 30 of the feed spool 15 is located in a pilot fluid control chamber defined by an end 31 of the feed spool bore and a recess 32 in the body cap 11 with the parts sealed together by a suitable O-ring structure. The control of the feed spool by pilot pressure will be more completely described subsequently.

The pressure compensator valve spool 16 is located in a bore in the valve body 10 having lands 35, 36, and 37 defining bore sections 38, 39, 40 and 41. The ends of the bore and particularly bore sections 38 and 41 are closed off by the end caps 11 and 12 fixed to the valve body 10 and sealed thereto by suitable O-ring structure.

The pressure compensator valve spool 16 has lands 42 and 43 with the land 43 coacting with the bore land 36 to control the rate of fluid flow to the feed spool 15. This is accomplished by having the inlet passage means for the pressure compensating flow control valve include the bore section 40 with a fluid inlet passage 45 connecting to the bore section 40 and the inlet passage means further including the bore section 39 which, through a connecting passage 46 in the valve body, communicates with the bore section 25 for the feed spool adjacent the land 27.

The pressure compensator valve spool is subjected to inlet pressure by an internal passage 50 in the valve spool leading to the end of the spool in bore section 41 and communicating with the inlet passage means through a radial passage 51. The opposite end of the pressure compensator valve spool and, more specifically, the end of the land 42 is acted upon by a spring 55 engaged between the land 42 and the end cap 11. The opening mounts a movable end stop 56 against which the land 42 can engage. The end of land 42 is also subjected to pressure existing downstream of the annular opening set by the feed spool through a passage 57 connecting the feed spool bore section 26 and the compensator valve spool bore section 38. With this construction, the pressure compensator valve spool operates in the conventional manner to sense pressure at both sides of the annular opening set by the feed spool and control the flow to the feed spool to maintain a nearly constant pressure drop across the annular opening set by the feed spool.

Flow out from the pressure compensated flow control valve is through an outlet passage 60 communicating with the feed spool bore section 26.

With the construction described, a rate of flow can be set within the range of operation of the valve under a remote control system for setting a pilot pressure that will act on the feed spool 15 in opposition to the rate spring 21 wherein the change in force exerted by the spring is directly proportional to the change in length thereof. This pilot pressure is applied against the feed spool land 30 and by control fluid supplied to the pilot fluid chamber 32 through a passage 62 extending vertically through the valve body 10 and capped at its lower end by a cap 63 and which communicates with a lateral passage 64 extending to an end of the valve body 10 and into the end cap 11 a sufficient distance to intersect a drilled passage 65 which is capped at 66 at an end and which extends to intersect with the control chamber 32.

Pilot pressure is set by the remotely controllable, electrically operated control head 17, shown particularly in FIGS. 1, 3 and 4. This control head is of the same construction as that shown in U.S. Pat. No. 3,411,531 and reference may be made thereto for a more detailed description of the mechanism.

As described in the referred to patent, the head includes a solenoid-controlled poppet valve 68 which coacts with a valve seat 69, with the degree of energization of the solenoid coil 70 determining the force with which the poppet valve 68 is urged toward its seat 69. The head further includes a flow control valve 71 with an orifice passage 71a mounted in a bore 72 and having a land 73 coacting with a passage 74 communicating with the vertically extending passage 62 through an orifice plug 75. Pilot fluid is supplied from the valve inlet 45 through passages, some of which are not shown, including passages 76 and 77, with the latter passage communicating with the bore 72 and with an orifice passage extending through the flow control valve 71. A spring 78 in the bore 72 acts in one direction against the flow control valve 71 and against the pressure drop across this valve caused by the orifice passage 71a, with the result that the land 73 modulates flow of fluid to the pilot pressure passage 74. The passage 80 having the seat 69 for the solenoid controlled poppet valve 68 is coplanar with the passage 74 supplying pilot pressure to the feed spool 15 whereby a controlled rate of fluid for supplying pilot pressure is provided by the flow control valve 71 and the setting of the pilot pressure is determined by the energization of the solenoid 70. The solenoid 70 can be in any suitable circuit to provide timed operation thereof and variable values of current or voltages energization thereof to set the desired pilot pressure. The pilot pressure set is transmitted to the feed spool land 30 and, dependent upon the value thereof, shifts the feed spool 15 a desired distance against the rate spring 21 to provide an annular opening of the desired size to result in the desired rate of fluid flow through the pressure compensated flow control valve.

Fluid flowing past the solenoid controlled poppet valve 68 flows through passages 81 and 82 leading to drain.

With the pressure compensated flow control valve now described, it is believed that the operations as shown diagrammatically in FIGS. 5 and 6 will be clear. As shown in FIG. 5, the valve is in association with a source of fluid under pressure, indicated at 90, and the fluid outlet 60 communicates with a fluid motor 91 in the form of a piston and cylinder, with a drain connection from the cylinder indicated at 92. In this operation, the pressure compensated flow control valve meters the flow of fluid into the motor with the flow being timed and controllable as to amount by the setting of the energization level of the solenoid 70.

In FIG. 6, the pressure compensated flow control valve is shown in circuit to meter out from a fluid motor, such as a piston-cylinder unit 95. In this system, a source of fluid 96 connects directly to the motor 95 through a control valve 97. A line 98 connects to the inlet line 45 of the pressure compensated flow control valve. In this system, an external source of pilot fluid is needed to supply volume independent of the controlled motor 95 and thereby a line 99 leading from the source 96 connects to line 77 leading to the pilot pressure control head and the line 76 connecting to the inlet passage 45 in blocked by a plug 100. Also, the line 60 connects to drain in this circuit arrangement.

It is believed that the operation will be evident from the foregoing. Briefly, the rate of fluid flow is controlled by the size of the annular opening set by the position of the tapered section 28 of the feed spool relative to the land 27. The hydraulic force required to position the feed spool for the desired size of annular opening is controlled by pilot pressure acting against an end of the feed spool and against the rate spring 21 and the pilot pressure is determined by the level of energization of the solenoid 70 of the pilot pressure control head. The pressure compensator valve spool 16 maintains a nearly constant pressure drop across the annular opening set by the position of the feed spool.

We claim:

1. A pressure compensated flow control valve comprising, a body with first and second bores, a feed spool in said first bore having a tapered section coacting with a bore land to define an annular opening and with the opening variable by the relative positioning of the tapered section and land to vary the rate of fluid flow, rate spring means in said first bore providing the sole force urging the feed spool in one direction, a pilot chamber at an end of the first bore to subject an end of the feed spool to pilot pressure acting in opposition to said rate spring means, fluid inlet passage means in said body for directing fluid to said annular opening and including a portion of said second bore, a pressure compensator valve in said second bore, second passage means subjecting said pressure compensator valve to fluid pressure at opposite sides of said annular opening whereby said pressure compensator valve controls the fluid inlet passage means to maintain a nearly constant pressure drop across the annular opening, and pilot pressure setting means to set the pilot pressure at a desired value to position the feed spool for a desired rate of fluid flow including a solenoid operated valve with the last mentioned valve increasing pilot pressure proportional to energization of the solenoid, said rate spring means increasing in resistance in direct proportion to the reduction in length thereof whereby each value of pilot pressure gives a known positioning of the feed spool for a particular rate of flow.

2. A pressure compensated flow control valve comprising an adjustable feed spool settable to establish an opening of the desired size for the desired rate of flow and urged in one direction by rate spring means, a pressure compensator valve for maintaining a nearly constant pressure drop across said opening, and remotely operable power means working against said rate spring means for positioning said feed spool to set the desired rate of flow, said power means including an electrically controlled valve for setting a pilot pressure acting on said feed spool in opposition to said rate spring means.

3. A flow control valve comprising, a body with a bore, a feed spool positioned in said bore and coacting with a portion thereof to define an opening therebetween for a controlled rate of flow therethrough with the size of the opening variable by the relative position of the spool in the bore, rate spring means in said bore urging said feed spool in one direction, a pilot chamber at an end of said bore to receive pilot pressure fluid acting on said feed spool in opposed relation to said rate spring means, variable means for establishing a pilot pressure to position the feed spool for the desired rate of flow, and a pressure compensator valve responsive to pressure at opposite sides of said opening to maintain a nearly constant pressure drop across the opening.

4. A flow control valve as defined in claim 3 with passages in said body providing for utilization of the flow control valve to either meter out or meter in fluid flow relative to a fluid motor.